(12) United States Patent
Marie

(10) Patent No.: US 12,535,565 B2
(45) Date of Patent: Jan. 27, 2026

(54) METHOD AND DEVICE FOR VISUALIZING IMPACTS OF LASER PULSES ON A TARGET

(71) Applicant: SAFRAN ELECTRONICS & DEFENSE, Paris (FR)

(72) Inventor: Vincent Marie, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 103 days.

(21) Appl. No.: 18/713,480

(22) PCT Filed: Nov. 22, 2022

(86) PCT No.: PCT/EP2022/082883
§ 371 (c)(1),
(2) Date: May 24, 2024

(87) PCT Pub. No.: WO2023/094409
PCT Pub. Date: Jun. 1, 2023

(65) Prior Publication Data
US 2025/0020784 A1    Jan. 16, 2025

(30) Foreign Application Priority Data
Nov. 25, 2021    (FR) ........................... 2112484

(51) Int. Cl.
G01S 7/487    (2006.01)
G01S 7/48    (2006.01)
G01S 17/89    (2020.01)
F41G 7/22    (2006.01)

(52) U.S. Cl.
CPC .......... *G01S 7/4873* (2013.01); *G01S 7/4804* (2013.01); *G01S 7/4876* (2013.01); *G01S 17/89* (2013.01); *F41G 7/226* (2013.01)

(58) Field of Classification Search
CPC .... G01S 7/4873; G01S 7/4804; G01S 7/4876; G01S 7/89; F41G 7/226
See application file for complete search history.

(56) References Cited

U.S. PATENT DOCUMENTS

| | | | |
|---|---|---|---|
| 2015/0212201 A1* | 7/2015 | Karazi | F41G 7/2293 |
| | | | 702/150 |
| 2015/0253111 A1* | 9/2015 | Caplan | F41G 7/2293 |
| | | | 244/3.11 |
| 2021/0247231 A1 | 8/2021 | Tipper et al. | |

FOREIGN PATENT DOCUMENTS

| | | |
|---|---|---|
| FR | 2740558 A1 | 4/1997 |
| FR | 2940463 A1 | 6/2010 |
| WO | WO-2021198631 A1 | 10/2021 |

* cited by examiner

Primary Examiner — Georgia Y Epps
Assistant Examiner — Don J Williams
(74) Attorney, Agent, or Firm — MUNCY, GEISSLER, OLDS & LOWE, P.C.

(57) ABSTRACT

A method for visualising impacts of laser pulses emitted by a laser designator, according to a predetermined repetition interval (PRI), onto a target present in a scene, by means of a device including: an optronic sensor of the silicone-based CMOS type having a predetermined number of rows associated with a rolling shutter-type readout circuit. Each row of the sensor is exposed for an exposure time and read during a reading time so that the exposure time is no less than the reading time but no more than the product of the reading time and the number of rows. A transition between the rows exposed to a signal and the rows not exposed to said signal is detected in at least two images in order to infer the PRI.

9 Claims, 8 Drawing Sheets

METHOD AND DEVICE FOR VISUALIZING IMPACTS OF LASER PULSES ON A TARGET

The present invention relates to the field of guiding, for example, the guiding of air munitions, such as missiles or rockets.

BACKGROUND OF THE INVENTION

Guided munitions generally comprise control surfaces, the orientation of which makes it possible to direct the munition and a guiding system connected to the control surfaces to orient these so as to direct the munition towards the target.

One of the guiding systems commonly used is the seeker (or "homing device") which comprises a sensor arranged to detect a signal coming from the target and a processing circuit which interprets the detection data coming from the control sensor for the control surfaces.

There are munitions which are equipped with a semi-active laser seeker, making it possible to detect the reflection on the laser pulse target projected by a laser designator. The laser designator can be embedded on the vehicle having shot the munition or on another vehicle; it can also be handled by a dismounted soldier located at some distance from the target. Furthermore, an observer can be led to observe the targeted target, in order to confirm that it is actually the correct target. The main features of the laser designator are:
- the emission wavelength (typically 1064 nm),
- the energy emitted per pulse (typically a few tens to a few hundreds of millijoules),
- the duration of a pulse (typically a few tens of nanoseconds),
- the predetermined repetition interval, or PRI (typically 50 to 120 ms).

The success of the guiding is based largely on the capacity to visualise the impact of the laser pulses on the target ("laser spot" is commonly referred to to reference this impact) and to measure the PRI, as the latter is a feature which makes it possible to discriminate the origin of the different laser spots which can be simultaneously present on a battlefield.

Indium gallium arsenide (InGaAs) CMOS sensors are used to visualise this spot, without however making it possible to determine the PRI. To detect the PRI, an avalanche photodiode-based "laser spot tracker"-type detector must be added to the CMOS sensor, which increases the complexity, the size, the consumption and the cost of the visualisation device.

AIM OF THE INVENTION

The invention, in particular, aims to enable the visualisation of impacts of laser pulses and to estimate the PRI simply, reliably and relatively inexpensively.

SUMMARY OF THE INVENTION

To this end, a method for visualising impacts of laser pulses emitted by a laser designator is provided, according to the invention, according to a predetermined repetition interval, onto a target present in a scene, by means of a device comprising: an optronic sensor of the silicone-based CMOS type having a predetermined number of rows, a rolling shutter-type readout circuit, and an image processing electronic circuit.

The method comprises the steps of:
- exposing each row of the sensor for an exposure time ($t_{EXPOSURE}$) and reading each row for a reading time ($t_{READOUT}$) so that the exposure time is no less than the reading time of each row, but no more than the product of the reading time of each row and the number of rows,
- detecting in each image frame provided by the reading circuit, a transition between the rows of the sensor exposed to a signal resulting from a reflection of one of the laser pulses and of the rows not exposed to said signal,
- estimating, from this transition, a pulse dating instant in at least two images and in order to infer the pulse repetition interval.

Thus, the invention exploits a disadvantage of the CMOS sensors associated with a rolling shutter readout circuit, namely the existence of a readout phase shift from one row to another (disadvantage which is conveyed by geometric artifacts and deformations on certain moving scene images). Indeed, with such an arrangement, the individual detectors (commonly called "pixels" or "photosites") have no memory: the exposure of the sensor (exposure time $t_{EXPOSURE}$) is done sequentially, row of individual detectors after row of individual detectors, and each row is read (reading time $t_{READOUT}$) from the end of its exposure, as is illustrated in FIG. 1. This is thanks to this time phase shift (equal to the reading time), that in the images, a zone exposed to the reflection of the pulses and an unexposed zone will exist, because the light output linked to the reflection of a laser pulse being brief, it will be interrupted before all the rows have been exposed. The detection of the transition is therefore relatively easy and, knowing the time phase shift between the rows, it is possible to estimate the PRI.

The invention also relates to a device for the implementation of this method.

Other features and advantages of the invention will emerge upon reading the description below of a particular and non-limiting embodiment of the invention.

BRIEF DESCRIPTION OF THE DRAWINGS

Reference will be made to the accompanying drawings, among which:

Figure 3:
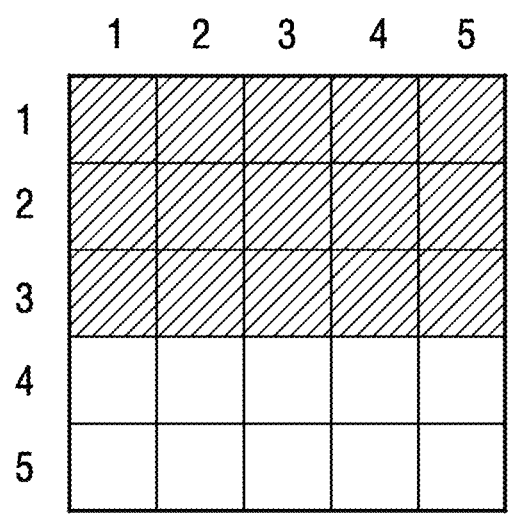

FIG. 3 is a view of the image corresponding to this detection, with the representation of the rows of the sensor;

Figure 5:
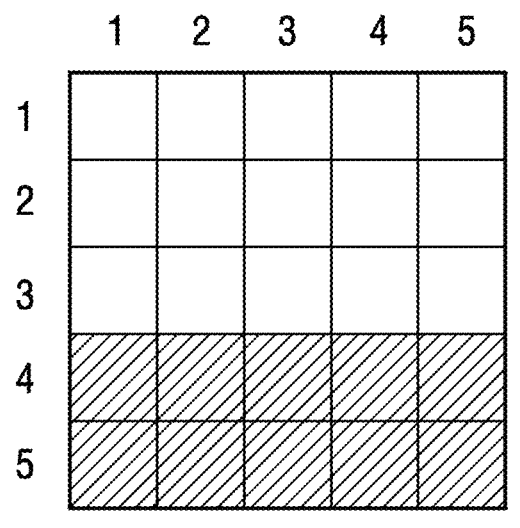

FIG. 5 is a view of the image corresponding to this other detection, with the representation of the rows of the sensor;

DETAILED DESCRIPTION OF THE INVENTION

The invention relates to a method and a device for visualising a scene and visualising laser pulse impacts emitted by a laser designator onto a target present in the scene. The main features of the pulses emitted by the laser designator are:
- the emission wavelength (typically 1064 nm),
- the energy emitted per pulse (typically a few tens to a few hundreds of millijoules),
- the duration of a pulse (typically a few tens of nanoseconds),
- the pulse repetition interval or PRI (typically 50 to 120 ms).

In the embodiment described, the data above are known by the user of the device: the user is, for example, facing a scene, wherein several targets are located, on each of which a laser designator is directed, projecting laser pulses forming a laser spot, and the user implements the device and the method of the invention to visualise the laser spot, but also determine the pulse repetition interval for the purpose of ensuring that the visualised laser spot actually corresponds to that which the user seeks. It will be noted that the invention is interesting, even for a user located in the presence of one single target illuminated by one single designator. The device of the invention can thus be used, both by the operator of the laser designator, a distinct observer, and also in a munition guided by said laser spot.

Figure 8:
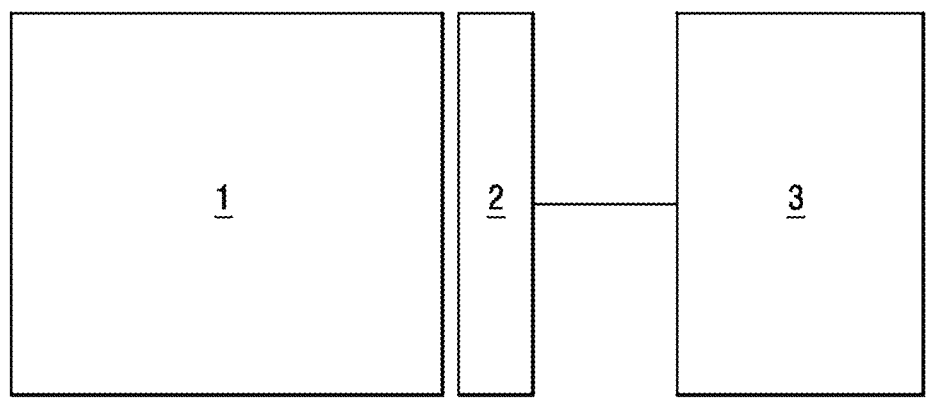
FIG. 8 is a flowchart of a visualisation device, according to the invention.

In reference to FIG. 8, the device of the invention comprises:
- an optronic sensor 1,
- an electronic readout circuit 2, and
- an electronic image processing circuit 3.

In a manner known per se, the optronic sensor 1 is of the silicone-based CMOS-type, having an epitaxial layer of sufficient thickness, so that the optronic sensor is sensitive to the wavelength of 1064 nm. The optronic sensor 1 comprises an array of individual detectors (or pixels or photosites), namely photodiodes, arranged in rows and in columns, the optronic sensor 1 having a predetermined number of rows Z, in this case equal to five, to simplify the description of the figures. Conventionally, each individual detector struck by a photon during the exposure phase is able to produce a charge which will be recovered by the readout circuit 2 during the reading phase.

Figure 1:
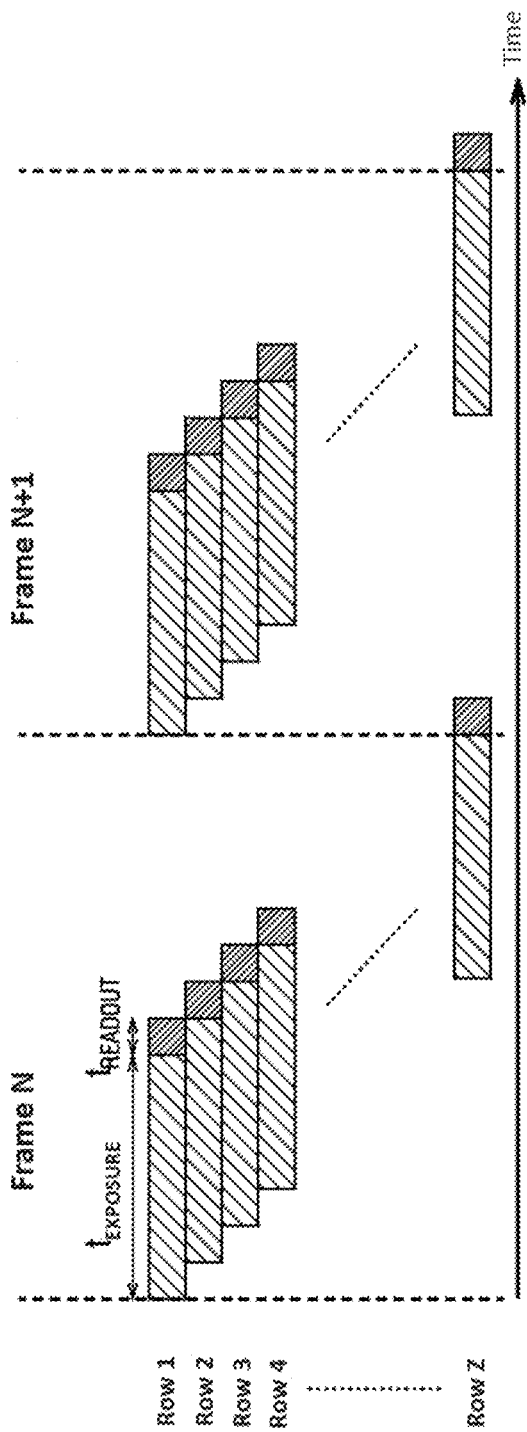
FIG. 1 is a time diagram, illustrating the operating mode of a rolling shutter readout circuit with a representation of the exposure time and of the reading time of each row, highlighting the existing time offset for the exposure of one row to the next one.

The readout circuit 2, known in itself, is of the rolling shutter type, and makes it possible to recover the charges from the individual detectors, row by row. More specifically, the readout circuit 2 can be controlled to expose each row for an exposure time $t_{EXPOSURE}$ and read each row for a reading time $t_{READOUT}$ (see in FIGS. 1, 2 and 4). The exposure time $t_{EXPOSURE}$ is adjustable by the readout circuit 2, while the reading time $t_{READOUT}$ is fixed. The readout circuit 2 provides image frames (which can be seen in FIG. 6), each image frame corresponding to an image, such as those represented in FIGS. 3, 5 and 7.

The processing circuit 3 comprises at least one processor and one memory containing at least one program which can be run by the processor to implement the method of the invention.

The method according to the invention comprises the steps of:
- directing the optronic sensor 1 towards the scene containing the target onto which the designator projects the laser pulses;
- exposing each row of the sensor for the exposure time $t_{EXPOSURE}$ and reading each row for the reading time $t_{READOUT}$, so that the exposure time $t_{EXPOSURE}$ is no less than the reading time $t_{READOUT}$ of each row, but no more than the product of the reading time $t_{READOUT}$ of each row and the number Z of rows, to obtain a video stream of the scene, and more specifically, of the target with the laser spot;
- detecting, in each image frame provided by the readout circuit 2, a transition between the rows of the optronic sensor 1 exposed to a signal resulting from the reflection of one of the laser pulses and from the rows not exposed to said signal,
- estimating, from this transition, a pulse instant in at least two images and inferring the pulse repetition interval.

Figure 7:
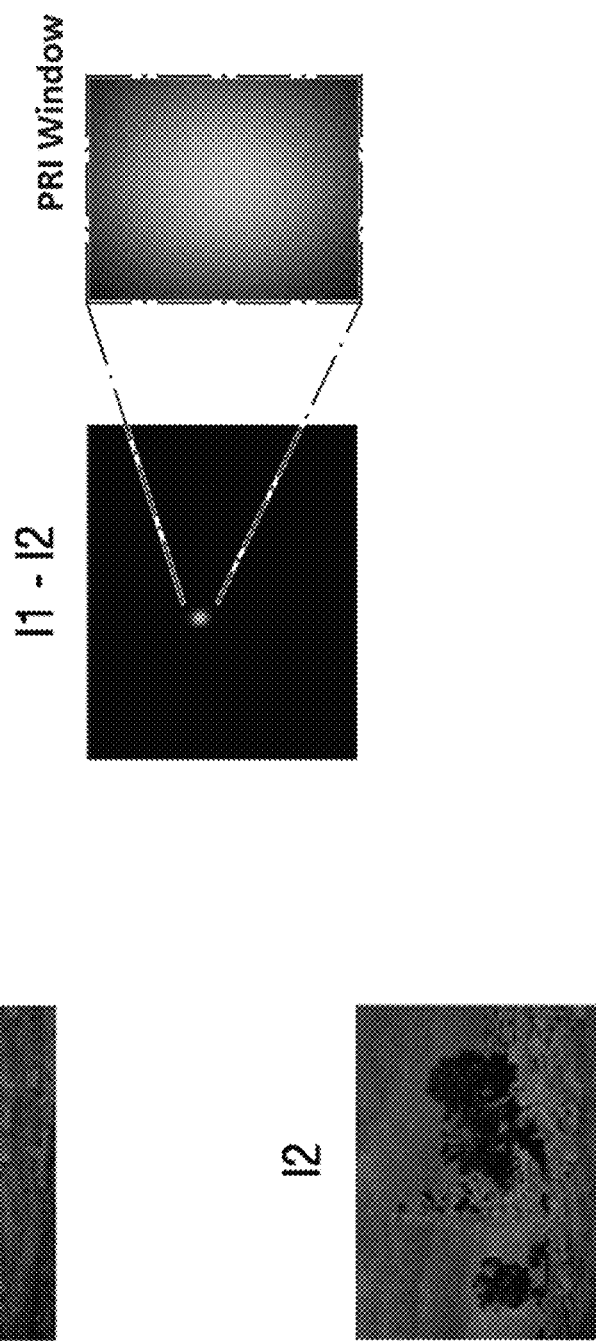
FIG. 7 is an illustration of the way in which the impact zone of the pulses in the scene is detected.

More specifically, in the preferred embodiment, the image processing circuit 3 is programmed to detect and isolate the laser spot in the images. To facilitate the detection of the laser spot in the image, the readout circuit 2 can be controlled during the image capture, so that each image frame of the video stream has a duration $t_{FRAME}$ less than or equal to half of the pulse repetition interval that is sought to be detected, and that the exposure time $t_{EXPOSURE}$ is greater than or equal to half of the duration $t_{FRAME}$. The first condition makes it possible to have at least one image on which the laser spot does not appear (this image therefore being representative of an ambient backdrop) and the second condition maximises the integration probability of the laser spot. Subsequently, the laser spot can be isolated on the images, and the ambient backdrop can be removed from each image frame, so as to only have the laser spot in the image. As illustrated in FIG. 7, an image I2 representing the backdrop is removed from the images I1 of a video stream representing the scene with the laser spot. The images I1-I2 of the resulting video stream thus mainly comprise the laser spot.

It is noted that the laser spot is off-centre and does not occupy the entire image field. Yet, so that the estimation of the PRI is robust, it is desirable that the laser spot occupies the entire image (in other words, the entire zone imaged by the optronic sensor 1). The image processing circuit 3 is programmed to define a window (or "Region of Interest") around the laser spot to obtain the "PRI window" image.

It is noted that a misalignment of the designator (resulting, for example, from atmospheric turbulences, of a stability defect of the designator or something else) could make the laser spot exit from the window defined during the windowing operation. If measuring PRI is sought to be made more robust to the misalignment, a defocusing can also be performed to limit the impact of such a misalignment during the windowing operation, such a defocusing making the laser spot grow in the image. The defocusing to be performed is proportional to the misalignment encountered. However, such a defocusing degrades the signal/noise ratio and therefore decreases the maximum measuring range, which is to be considered if it is chosen to perform it.

The image processing circuit 3 is thus programmed to analyse each image of the video stream. Two scenarios are possible, as regards the detection of the laser pulse by the optronic sensor 1 when the exposure time $t_{EXPOSURE}$ is no less than the reading time $t_{READOUT}$ of each row, but no more than the product of the reading time $t_{READOUT}$ of each row and of the number Z of rows.

Figure 2:
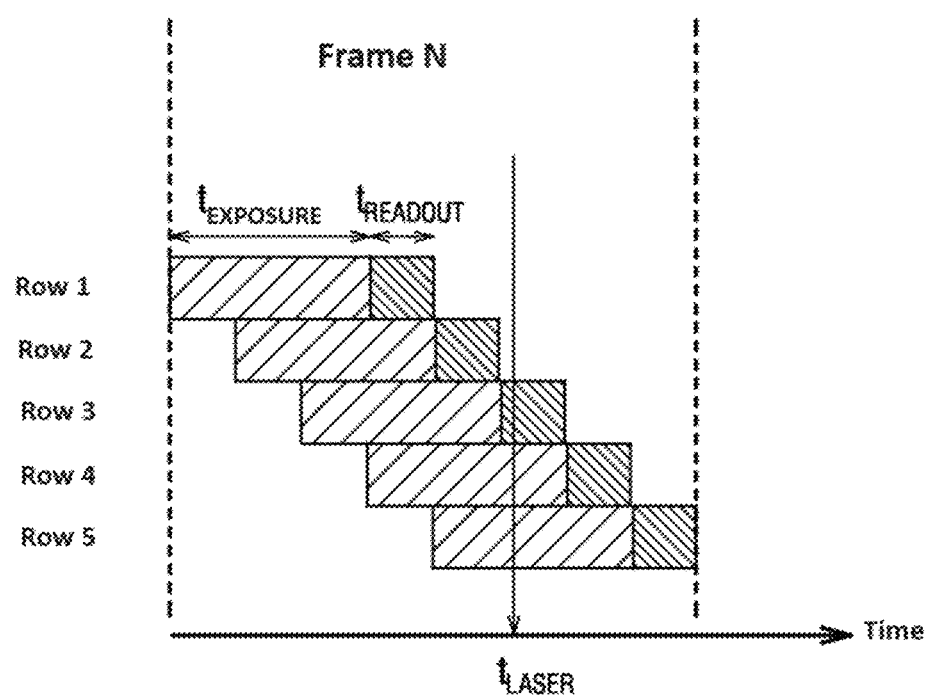
FIG. 2 is a time diagram, similar to that of FIG. 1, illustrating the detection of a laser pulse.

In FIG. 2, the appearance instant $t_{laser}$ of a laser spot has been represented with respect to the exposure time $t_{EXPOSURE}$ and to the reading time $t_{READOUT}$ of each row of the optronic sensor 1. It is seen that the appearance instant occurs after the exposure time of rows 1 to 3 and for the exposure time of rows 4 and 5. The resulting image, extracted from the video stream and which can be seen in FIG. 3, therefore comprises a zone not exposed to the pulse (occupying the upper three-fifths of the image) and a zone exposed to the pulse (occupying the lower two-fifths of the image).

Figure 4:
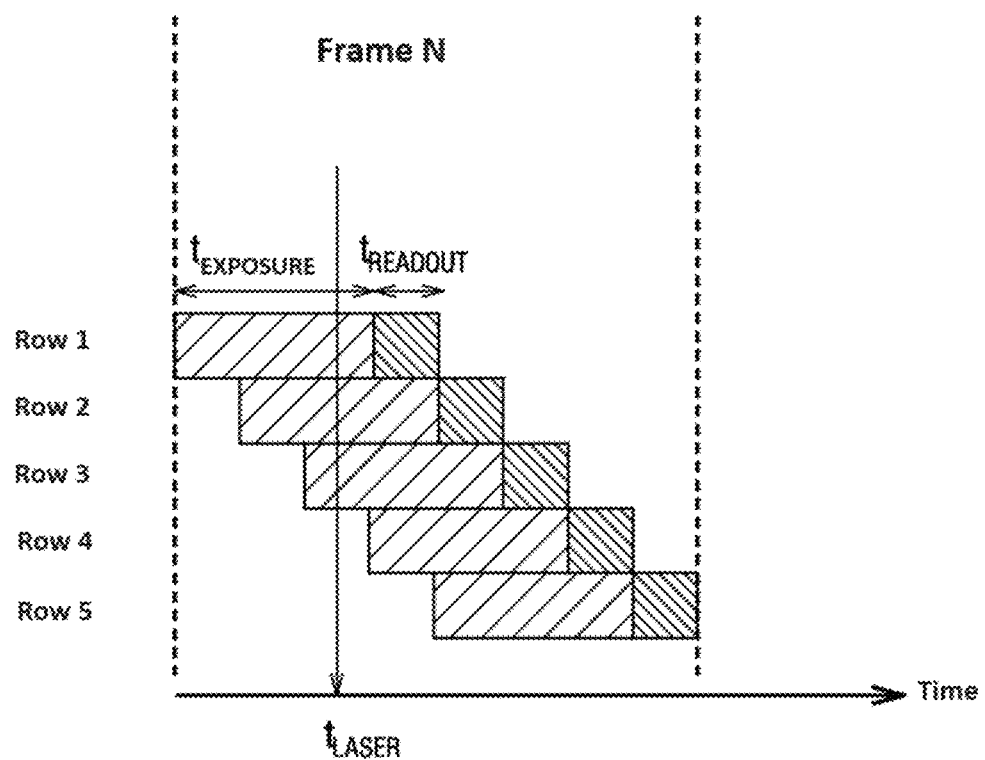
FIG. 4 is a time diagram, similar to that of FIG. 1, illustrating another detection of a laser pulse.

In FIG. 4, the appearance instant $t_{laser}$ of a laser spot has been represented with respect to the exposure time $t_{EXPOSURE}$ and to the reading time $t_{READOUT}$ of each row of the optronic sensor 1 according to a time sequence which is different from that of FIG. 2. It is seen that the appearance instant occurs for the exposure time of rows 1 to 3 and before the exposure time of rows 4 and 5. The resulting image, extracted from the video stream and which can be seen in FIG. 5, therefore comprises a zone exposed to the pulse (occupying the upper three-fifths of the image) and zone not exposed to the pulse (occupying the lower two-fifths of the image).

The transition between the two zones is therefore a precise indicator to the nearest reading time, of the laser pulse (more precise than the laser pulse duration is short—ratio, in this case, of between 100 and 1000—with respect to the product of the number of rows of the sensor and of the sum of the exposure times and the reading of each row). The detection of the transition is, in this case, performed by comparing the value of each pixel of each row of the image to an adjusted threshold according to a noise level of the optronic sensor 1. Preferably, each image frame of the video stream has a duration less than or equal to half of the pulse repetition interval that is sought to be detected, in order to also facilitate the detection of the transition.

It is now possible to estimate the instant $t_{laser}$ in an image n from the following equations:

for the case corresponding to FIGS. 2 and 3

$$t_{0,n} + t_{EXPOSURE} + (L_{1,n} - 1) * t_{READOUT} \leq t_{laser,n}$$

$$t_{laser,n} \leq t_{0,n} + t_{EXPOSURE} + L_{1,n} * t_{READOUT}$$

for the case corresponding to FIGS. 4 and 5

$$t_{0,n} + (L_{1,n} - 1) \times t_{READOUT} \leq t_{laser,n} \leq t_{0,n} + L_{1,n} \times t_{READOUT}$$

with, in both cases, $t_{0,n}$ the initial instant of the image frame n, $L_{1,n}$, the index of the last row of the sensor preceding the transition detected in the image frame n, $t_{laser,n}$, the dating instant of the laser pulse in the image frame n, This estimation is precise to the nearest reading time.

In addition, in the video stream, several image frames are had, and it will be sought to detect a transition in each of the corresponding images, to be able to calculate the pulse repetition interval.

Figure 6:
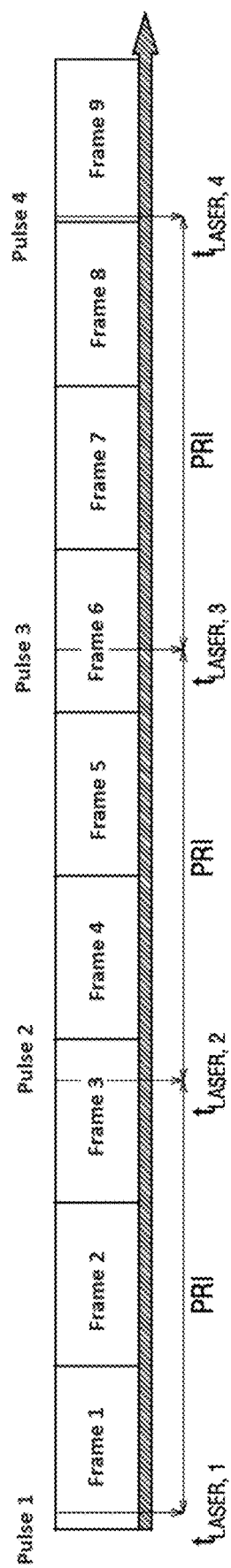
FIG. 6 is a time representation of the succession of image frames and of detection instants of the laser pulses.

Thus, it is seen in FIG. 6, that the pulse 1 has been emitted during the capture of the frame 1, the pulse 2 has been emitted during the capture of the frame 3, the pulse 3 has been emitted during the capture of the frame 6, and the pulse 4 has been emitted during the capture of the frame 9.

The detection of transition in the image frames 1 to 9 will make it possible to determine the pulse instant $t_{laser}$ in each of the frames 1, 3, 6 and 9, and make it possible to calculate the pulse repetition interval by using the following formula:

$$PRI = (t_{laser,n+m} - t_{laser,n})/m$$

with $t_{laser,n}$, the dating instant of the laser pulse in the frame n, $t_{laser,n+m}$, the dating instant of the laser pulse in the frame n+m, m, the number of frames separating the frames n and n+m.

In the example of FIG. 6, the frames 1 and 3, 1 and 6, 1 and 9, 3 and 6, 3 and 9, and/or 6 and 9 can be chosen to calculate the PRI.

Naturally, the invention is not limited to the embodiment described, but comprises any variant entering into the field of the invention, such as defined by the claims.

In particular, the device can have a structure which is different from that described.

The number and the arrangement of the circuits and the distribution of the functions between the circuits can be modified.

Furthermore, it is possible to not determine the position of the laser spot by detection, but by an initial knowledge of the zone targeted in the image and of the angular extent of the laser spot.

All or some of the following features can be omitted:

the detection of transition performed by using an adjusted threshold according to a noise level of the sensor;

the duration of the image frames less than or equal to half of the pulse repetition interval;

the removal of the ambient backdrop, so as to isolate said signal in all or some of the image frames;

the recentring of the image frame around the impacts, prior to the detection of the transition;

the defocusing to facilitate the recentring of the image frame around the impacts.

Thus, the defocusing operation is not necessary, if the risk and/or the misalignment amplitude are low.

Thus, it is not necessary to perform a windowing, if it is chosen, from the image capture to narrow the field of the sensor on the laser spot (for example, by means of a group of lenses with adjustable focal distance).

The ratio between the duration of the laser pulse and the product of the number of rows of the sensor and of the sum of the exposure time and of reading of each row can be smaller or larger than that mentioned, according to the precision sought.

Some of the image can only be explored, for example, that having the configuration of FIG. 3 or that of FIG. 5.

The invention claimed is:

1. A method for visualising impacts of laser pulses emitted by a laser designator, according to a predetermined repetition interval (PRI), onto a target present in a scene, by means of a device comprising: a silicone-based CMOS-type optronic sensor having a predetermined number of rows, a rolling shutter-type reading circuit, and an electronic image processing circuit; the method comprising the steps of:

exposing each row of the sensor for an exposure time and reading each row for a reading time so that the exposure time is no less than the reading time of each row, but no more than the product of the reading time of each row and the number of rows, detecting, in each image frame provided by the readout circuit, a transition between the rows of the sensor exposed to a signal resulting from a reflection of one of the laser pulses and of the rows not exposed to said signal, estimating, from this transition, a pulse dating instant in at least two images and in order to infer the pulse repetition interval.

2. The method according to claim 1, wherein the detection of transition is performed by using an adjusted threshold according to a noise level of the sensor.

3. The method according to claim 2, wherein each image frame has a duration less than or equal to half of the pulse repetition interval.

4. The method according to claim 3, wherein the image processing circuit is arranged to remove an ambient backdrop from each image frame, so as to isolate said signal.

5. The method according to claim 1, wherein the pulse dating instant is estimated from the following formulas:

$$t_{0,n} + t_{EXPOSURE} + (L_{1,n} - 1) * t_{READOUT} \le t_{laser,n}$$

$$t_{laser,n} \le t_{0,n} + t_{EXPOSURE} + L_{1,n} * t_{READOUT}$$

$$t_{0,n} + (L_{1,n} - 1) \times t_{READOUT} \le t_{laser,n} \le t_{0,n} + L_{1,n} \times t_{READOUT}$$

with $t_{0,n}$, the initial instant of the image frame n, $L_{1,n}$, the index of the last row of the sensor preceding the transition detected in the image frame n, $t_{laser,n}$, the dating instant of the laser pulse in the frame n.

6. The method according to claim 5, wherein the pulse repetition interval (PRI) is estimated from the following equation:

$$PRI = (t_{laser,n+m} - t_{laser,n})/m$$

with $t_{laser,n}$, the dating instant of the laser pulse in the frame n, $L_{laser,n+m}$, the dating instant of the laser pulse in the frame n+m, m, the number of frames separating the frames n and n+m.

7. The method according to claim 1, comprising the step of recentring the image frame around the impacts, prior to the detection of the transition.

8. The method according to claim 7, comprising the step of performing a defocusing to facilitate the recentring of the image frame around the impacts.

9. A device for visualising a scene and impacts of laser pulses emitted by a laser designator, according to a predetermined repetition interval (PRI), onto a target present in the scene, comprising: a CMOS-type optronic sensor having a predetermined number of rows, a rolling shutter-type readout circuit which can be controlled to expose each row for an exposure time and reading each row for a reading time, so that the exposure time is no less than the reading time of each row, but no more than the product of the reading time of each row and the number of rows, and an electronic image processing circuit arranged to implement the method according to claim 1.

* * * * *